J. W. BRYCE.
AUTOMATIC SCALE.
APPLICATION FILED JAN. 29, 1917.
1,392,908.
Patented Oct. 11, 1921.
Fig. 1,
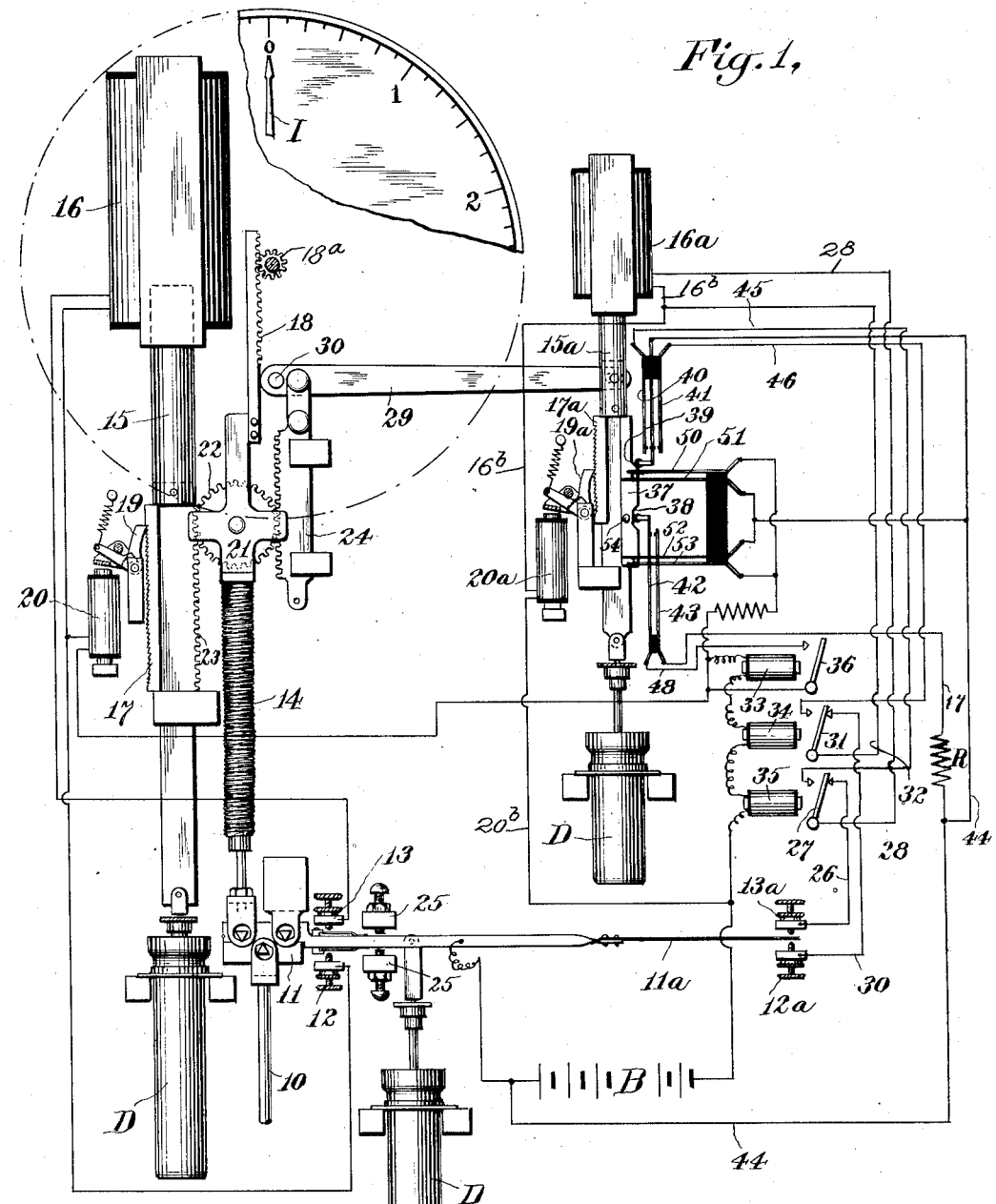
Fig. 2,
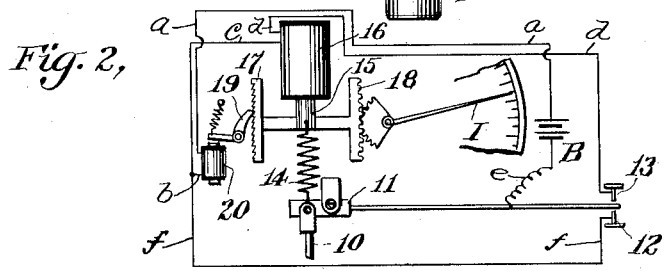
INVENTOR.
James W Bryce
BY Kerr Page Cooper & Hayward
ATTORNEYS.

UNITED STATES PATENT OFFICE.

JAMES W. BRYCE, OF BLOOMFIELD, NEW JERSEY, ASSIGNOR TO THE COMPUTING SCALE COMPANY, OF DAYTON, OHIO, A CORPORATION OF OHIO.

AUTOMATIC SCALE.

1,392,908. Specification of Letters Patent. Patented Oct. 11, 1921.

Application filed January 29, 1917. Serial No. 145,132.

*To all whom it may concern:*

Be it known that I, JAMES W. BRYCE, a citizen of the United States, residing at Bloomfield, in the county of Essex and State of New Jersey, have invented certain new and useful Improvements in Automatic Scales, of which the following is a full, clear, and exact description.

This invention relates to improvements in scales and more particularly to the provision of means for moving a chart, weight indicator, or other device which is to be set proportionally to weight, by an independent source of power, independent of the motive power due to gravity of the scale. The arrangement is such that the frictional load of these parts does not in any way influence the correctness of the weighing.

In order to attain these results I provide means for automatically applying a counter-pull to the scale which is equal and opposed to the force of gravity, or gravity-pull, tending to move such parts downward. The counter-pull, or more exactly the displacement of parts corresponding and proportional to the counter-pull is then measured by any suitable mechanism. In the present embodiment I have shown a visual indicating mechanism for indicating the load, but it will be understood that the invention is particularly adaptable for use in combination with recording and computing mechanisms which usually impose so high a friction load upon a scale that their extensive and successful use is minimized.

Another feature of the present invention resides in the arrangement of the counter-pull device in such a manner that the weight moved parts are practically static in their action, in other words, their range of movement is exceedingly slight whereby momentum and inertia are avoided.

Other objects of my invention will be pointed out in more detail in the accompanying specification and more particularly defined in the appended claims.

In the drawings Figure 1 is a front elevation showing somewhat diagrammatically my improved counter-pull scale.

Fig. 2 is a small diagrammatic view to show a simplified modification, and which diagram also clearly illustrates the underlying principles of present invention.

The underlying principles of the present device will first be explained with reference to Fig. 2, similar reference characters being used, where possible, on the device shown in Fig. 1.

10 is a draft rod which may be attached directly to a scale pan or to any suitable base lever construction in a platform scale. This rod is pivotally attached to a contact beam 11 which is pivotally supported upon the usual knife edge bearing and which has an extended end adapted to float freely between contacts 12 and 13 when there is no load upon the scale.

Attached to the contact beam is an electromechanical means, including spring 14 which connects at its upper end with a core 15 of a solenoid 16, to exert the desired counter-pull on the beam. Attached to core 14 is a retaining ratchet-toothed rack 17 and a rack 18 adapted to drive a weight indicating device I through a gear segment. Retaining pawl 19 is normally held in locking engagement with ratchet 17 by a spring and is adapted to be withdrawn therefrom by the energization of a releasing magnet 20.

When a load comes upon the draft rod 10, contact beam 11 will move and establish electrical contact with 13, thereby permitting current to pass from battery B through wire $a$, releasing magnet 20, wires $b$ and $c$, solenoid 16, wire $d$, contact 13, beam 11, and wire $e$ back to the battery, so as to energize solenoid 16 and releasing magnet 20. Core 15 will be drawn into its solenoid and will elevate and apply counter-pull to the upper end of spring 14. The counter-pull will increase and hence the spring or equivalent yielding connection will continue to be stretched or distended until the counter-pull exerted thereon exactly counterbalances the load upon the lever or beam 11 which the latter receives from the draft rod. It will be understood that these forces of gravity and counter-pull are not necessarily mathematically equal, since they react upon the beam at different points and proper allowance is, of course, made for this variation in leverage. With this condition, lever or contact beam 11 will be in equilibrium and float between contacts 12 and 13, breaking the solenoid-energizing circuit, deënergizing solenoid 16 and magnet 20 and permitting pawl 19 to engage ratchet 17 and retain it in the position to which it was set by the solenoid 16. Core 15 and rack 18 are now elevated proportionally to the load on the scale pan and the indicator I moved to a position to indicate the load.

If some or all of the load is removed from the scale pan, or should the spring 14 be pulled upward to an extent more than sufficient to counterbalance the load, contact beam 11 will be rocked into engagement with contact 12 by the tension of spring 14 (which tension is now greater than the weight of the load), thereby establishing a shunt circuit across solenoid 16, as follows: from battery B through wire $a$, releasing magnet 20, wires $b$ and $f$, contact 12, beam 11, and wire $e$ back to the battery. This energizes magnet 20, causing pawl 19 to be withdrawn from ratchet 17. The solenoid 16 being thus deënergized, core 15 will then descend until the contact beam 11 is again in equilibrium floating freely between contacts 12 and 13.

The device shown in Fig. 1 will now be described. This construction embodies the general mode of operation of the device shown in Fig. 2, but also includes a means for first automatically applying a counter-pull for coarsely approximating the weight and for thereafter applying a counter-pull for finely adjusting the parts. Certain other novel features will also be included which will be explained in detail hereafter.

Coarse adjustment device.

The draft rod 10, Fig. 1, connects with contact beam 11 which floats between coarse contacts 12 and 13, as in Fig. 2. Spring 14 is pivotally attached to the contact beam 11, but the upper end of the spring is attached to a carrier 21 carrying indicator driving rack 18 adapted to mesh with a pinion 18$^a$ and rotate indicator hand I. Revoluble on a stud on the carrier 21 is a gear 22 meshing with a rack 23 carried by core 15, and also with a fine adjustment rack 24. Solenoid 16, releasing magnet 20, spring pawl 19, and ratchet 17 are similar to corresponding numbered parts in Fig. 2, described above. I also contemplate the provision of a plurality of pawls 19 having their teeth of different lengths, so that one or the other of the pawls will immediately engage the ratchet and give very accurate adjustment. As this is a well known construction, it is not herein illustrated.

The operation is similar to the operation heretofore explained, except that the upward movement of the core 15 through rack 23 turns gear 22 and, as rack 24 is stationary for the time being elevates carrier 21 and rack 18 to an extent equal to the stretch of the spring 14 due to the load upon the draft rod.

In order to dampen the oscillation of the parts, I provide dash pots D. I also provide limiting stops 25 adapted to limit the extreme movements of contact beam 11.

The parts heretofore described are adapted to automatically apply an approximate counter-pull to balance the opposed load on the draft rod and turn the indicator I to indicate the load approximately. After this coarse adjustment has been made, a second mechanism comes into action to give the parts a fine adjustment and accurately position the approximately set indicator.

Fine adjustment device.

Attached to the end of contact beam 11 is a blade 11$^a$ adapted to establish contact with contact device 12$^a$ or 13$^a$. These are the contact devices which establish the circuit to make a fine adjustment. Suppose, for example, that beam 11 is out of contact with 12 and 13, but not quite in equilibrium, causing blade 11$^a$ to establish a contact with 13$^a$. Current will now flow from battery B, blade 11, 11$^a$, contact 13$^a$, wire 26, relay arm 27, wire 28, small solenoid 16$^a$, wire 16$^b$, releasing magnet 20$^a$ and back to battery. Core 15$^a$ will be drawn up thereby elevating the right hand end of a lever 29 pivoted at 30 and attached to the upper end of rack 24. The elevation of this rack will now turn pinion 22 and elevate the indicator rack 18 in a similar manner as heretofore explained. It may be here stated that during this fine adjustment operation, ratchet 17 is held in position by pawl 19 and that the increment of lift imparted to indicating rack 18 is slight by reason of the leverage acting on rack 24. In this way the approximate counter-pull or tension on the spring 14 is accurately adjusted, and the indicator I is correspondingly closely set.

As soon as the circuit is broken at 13$^a$, solenoid 16$^a$ will be deënergized, likewise magnet 20$^a$, and pawl 19$^a$ will reëngage ratchet 17$^a$.

Should a current be established at fine adjustment lower contact 12$^a$, due to insufficient tension on spring 14, current will flow from battery B through parts 11, 11$^a$, contact 12$^a$, wire 30, relay arm 31, wire 32, magnet 20$^a$ and back to battery. This allows core 15$^a$ to fall and decrease the tension on the upper end of spring 14, as will be readily understood.

In order to prevent the fine adjusting devices from operating during the coarse adjusting operation, I provide the relays 33, 34, 35. An examination of the circuits will show that when either contact 12 or 13 is engaged by the beam 11, the relays 33, 34, 35 will be energized, thereby drawing relay arms 31 and 27 forward and breaking the circuits leading to the fine contacts 12ª and 13ª.

*Centering devices.*

After a number of operations of the machine it is conceivable that the fine adjustment devices would be elevated or depressed to a point where they would have insufficient additional range of movement to carry out succeeding fine adjustments. I accordingly provide means for centering the fine adjusting solenoid core and coöperating parts at each operation and preferably carry out this centering during the coarse adjusting operation.

Attached to core 15ª is a cam plate 37, centrally notched at 38 and beveled at the upper end to coöperate with a contact arm 39. When cam plate 37 is in lower position, contact 39 will move to the left and establish contact with a blade 40, and when in upper position will be forced into contact with blade 41. Similarly when depression 38 is above or below normal central position, the high part of cam 37 will force contact 42 into contact with a blade 43.

Suppose a condition with cam plate 37 below center or below the normal position. To properly center the core 15ª, it should be raised. Current will flow from battery B through wire 44, contact 39, blade 40, wire 45, relay arm 27 (the relay being closed by reason of the blade 11 contacting with 12 or 13,) wire 28, solenoid 16ª, wire 16ᵇ, magnet 20ª, and wire 20ᵇ to battery. Energization of solenoid 16ª will draw up core 15ª and the upward movement will continue until the bevel edge of cam plate 37 breaks contact between 39 and 40. Thereafter pawl 19ª will retain the core in central position until the fine adjustment is made.

In case core 15ª is too high, contact 39 would contact with 41 and establish the following circuit. From battery B, through wire 44, contacts 39 and 41, wire 46, relay arm 31, wire 32, magnet 20ª, wire 20ᵇ and back to battery. This will release the pawl 19ª and permit the core 15ª to drop to central position.

It will be understood that the above described centralizing action will occur when current is flowing in relays 34, 35 by reason of contacts 12 or 13 being "live." It is conceivable that the circuit would be broken at these contacts 12 or 13 before the centralizing of the fine adjustment parts be completed. In order to supply current to relays 34 and 35 under such conditions, I provide relay 33 and contact devices 42—43. When the coarse adjustment is being made relay 33 will be energized. Then if the cam plate 37 is away from central position, a circuit will be established from battery B, wire 44, resistance R, wire 47, contacts 43, 42, wire 48, relay arm 36 and through relay windings 33, 34 and 35 back to battery. Relay 33 may be considered to be a supply relay to furnish current to relays 34, 35 until the centralizing operation is completed.

In weighing certain materials it is conceivable that small quantities might be successively added or abstracted which would cause a continuous up or down movement of the fine adjusting device without closing the coarse adjustment contacts for a sufficient time to re-centralize the fine adjustment solenoid. As an example of such a condition consider grains of a granular material being added to the scale pan. The fine adjustment core 15ª would slowly creep up and might eventually reach its limit of movement. Then the addition of further slight quantities might cause no effect on the scale indicator until the coarse contacts 12—13 came into action. To obviate and overcome this action I provide limit contacts 50—51 and 52—53. The limit contacts are adapted to be closed by means of a pin 54 carried by cam plate 37. When one or the other of these limit contacts is closed current is supplied to relays 33, 34, 35. Thereafter the centralizing relays and core 15ª act. The load formerly compensated for by the close adjusting device will be transferred to the coarse adjustment device. The coarse solenoid will then take up the load and apply additional tension to the spring 14. If minute quantities are removed, instead of added, the process will be reversed, as will be readily understood.

By the employment of the construction shown herein it is possible to secure extremely accurate indications of weight and at the same time the friction of the indicating parts does not in any way influence the weighing since the motive power due to gravity of the mass weighed is not utilized to differentially move the parts. Furthermore, the present construction increases the utility of a scale in that many sorts of mechanisms can be associated with the scale to be displaced in accordance with the load thereon, and these auxiliary mechanisms need not be delicate devices requiring a minimum of power to move them. Furthermore, the actual range of movement of scale-moved parts is extremely small. This minimizes inertia effects, which is desirable in all scale construction.

Hereafter in the claims I will refer to the spring 14 as a yielding means. The term yielding means is to be understood as referring broadly to springs and equivalent devices which yield under load and exert an increasing pull to the parts to which they are connected when they so yield or distend.

It is to be understood that the invention is not limited to the specific construction herein illustrated and described but can be embodied in other forms without departure from its spirit as defined by the following claims.

I claim:

1. In a scale, the combination with a movable support for the load, and yielding means to oppose the gravity pull of the load, of means normally inactive but adapted to be put in operation by the movement of said support to exert through said yielding means a counter-pull just efficient to counterbalance the load.

2. In a scale, the combination with a support for the load, and yielding means for opposing the gravity pull of the load, of means for exerting on the load support through said yielding means a counter-pull against the gravity pull, and automatic means under control of the load support for stopping the counter-pull exerting means when the pull exerted thereby is just sufficient to counterbalance the gravity pull of the load.

3. In a scale, the combination with a movable load-support, and yielding means for opposing the gravity pull of the load, of means for exerting on the load-support through said yielding means a counter-pull against the gravity pull, and devices controlled by the movement of the load-support to start the counter-pull exerting means when the counter-pull is less than the gravity pull and stop the same when the counter-pull is substantially equal to the gravity pull.

4. In a scale, the combination with a support for the load, and yielding means to oppose the gravity-pull of the load, of an external source of energy, and means controlled by the movement of the load-support for connecting said source of energy to said yielding means to exert on the load support through said yielding means a continually increasing counter-pull in opposition to the gravity-pull, said means for connecting the source of energy being automatically controlled to disconnect said source when the counter-pull is just sufficient to counterbalance the gravity-pull, whereby equilibrium is produced and maintained.

5. In a scale, the combination of a support for the load, and yielding means to oppose the gravity-pull of the load, of means responsive to movement of the load support for exerting thereon through said yielding means a counter-pull equal to the gravity-pull to produce and maintain equilibrium, means for arresting the counter-pull exerting means when equilibrium is attained, and automatic means for indicating the total force of the counter-pull exerted on the load.

6. In a scale, in combination with a support for the load, and a contractile spring connected with the load support, displaceable means for extending the spring against the gravity-pull of the load, an external source of energy to actuate the spring-extending means and thereby exert a counter-pull on the load support, means controlled by the movement of the load support for connecting said source with the spring-extending means to actuate the same and for disconnecting said source from the spring-extending means when the counter-pull is equal to the gravity-pull, and means for locking the displaced spring-extending means when said source is disconnected therefrom.

7. In a scale, the combination with a load support, and a contractile spring connected with the load support, of displaceable means for extending the spring against the gravity-pull of the load, an external source of energy to actuate the spring-extending means and thereby exert a counter-pull on the load support, means controlled by the movement of the load support for connecting said source with the spring-extending means to actuate the same and for disconnecting said source from the spring-extending means when the counter-pull exerted on the load support is just sufficient to counter-balance the gravity-pull, means for locking the spring-extending means when said source is disconnected therefrom, and means for indicating the total displacement of said spring-extending means as a measure of the gravity-pull of the load.

8. In a scale, the combination with a load support and means to oppose the gravity-pull of the load, of yielding means for exerting a counter-pull on the load support through the yielding means to approximately balance the gravity-pull of the load, and means for thereafter accurately adjusting the counter-pull.

9. In a scale, the combination with a load support, and yielding means to oppose the gravity-pull of the load, of means for exerting a counter-pull on the load support through the yielding means to balance the load, said means comprising successively acting devices to first roughly approximate the counter-pull, and to thereafter finely adjust the counter-pull.

10. In a scale, the combination with a load support, and yielding means to oppose the gravity-pull of the load, of means for exerting a counter-pull on the load support through the yielding means to balance the gravity-pull of the load, said means comprising successively acting devices to first roughly approximate the counter-pull and to thereafter finely adjust the counter-pull, and means for measuring the gravity-pull of the load, said measuring means being connected with and actuated by the counter-pull exerting means.

11. In a scale, the combination with a load-support, and yielding means to oppose the gravity pull of the load, of means for exerting a counter-pull on the load support through the yielding means to balance the load, said means comprising automatically acting devices to first roughly approximate the counter-pull and to thereafter finely adjust the counter-pull.

12. In a scale, the combination with a load support, and yielding means to oppose the gravity pull of the load, of means for exerting a counter-pull on the load support through the yielding means to balance the gravity-pull of the load, said means comprising automatically acting devices to first roughly approximate the counter-pull, and means for measuring the gravity-pull of the load, said measuring means being connected with and actuated by the counter-pull exerting means.

13. In a scale, the combination with a load support, and yielding means to oppose the gravity pull thereof, of means for exerting a counter-pull on the load support through the yielding means to balance the gravity-pull of the load, said means comprising a coarse counter-pull exerting means and a fine counter-pull exerting means, and means for centralizing the fine counter-pull exerting means at each operation.

14. In a scale, the combination with a load support, and yielding means to oppose the gravity pull thereof, of means for exerting a counter-pull on the load support through the yielding means to balance the load, said means comprising a coarse counter-pull exerting means and a fine counter-pull exerting means, and means for centralizing the fine counter-pull exerting means when the limit of its capacity is reached.

15. In a scale, the combination with a load support, and yielding means to oppose the gravity pull thereof, of means for exerting a counter-pull on the load support through the yielding means to balance the load, said means comprising a coarse counter-pull exerting means and a fine counter-pull exerting means, and means for centralizing the fine counter-pull exerting means at each operation of the coarse counter-pull exerting means and whenever the limit of capacity of the fine counter-pull exerting means is reached.

16. In a scale, the combination with a load support, and a yielding element connected therewith, of electro-mechanical means connected with the yielding element to exert through the latter on the load support a counter-pull against the gravity-pull of the load, an energizing circuit for the said means, and means for breaking the energizing circuit when the counter-pull on the load support is equal to the gravity-pull thereon.

17. In a scale, the combination with a load support, and a yielding element connected therewith, of electro-mechanical means connected with the yielding element to exert through the latter on the load support a counter-pull against the gravity-pull of the load, an energizing circuit for said means, means for breaking the energizing circuit when the counter-pull exerted on the load support is equal to the gravity-pull, and means for indicating the amount of such counter-pull.

18. In a scale, the combination with a load support, and a yielding element connected therewith, of electro-mechanical means to exert through the yielding element on the load support a counter-pull against the gravity-pull of the load, a normally open energizing circuit for said means, means under the control of the load support to close the energizing circuit when the load support is moved in one direction by the gravity-pull of the load and to open the circuit when the load support is moved in the other direction by the counter-pull, automatic means to lock the yielding element when the said circuit is broken, and means for indicating the force of the counter-pull exerted on the load support.

19. In a scale, the combination with a load support, and a yielding element connected with the load support, of power-driven means for exerting through the yielding element on the load support a counter-pull against the gravity-pull of the load, automatic means for stopping the operation of the power-driven means when the counter-pull exerted thereby on the load support is sufficient to balance the gravity-pull of the load, and means actuated in proportion to the total yield of the yielding element to indicate the gravity-pull of the load.

20. In a scale, the combination with a load support, a beam operatively connected thereto and means for indicating the weight of the load; of counter-pull exerting means controlled by load and applied to the load support for applying variable forces at a predetermined point upon said beam for approximately restoring the position of the load; and means, comprising a power device supplied with power independent of the gravity pull of the load, and controlled by the applied load for more nearly restoring the position of the load.

21. In a scale, in combination, a scale beam having a load support operatively connected thereto; means for applying variable forces at a predetermined point upon said beam and controlled by applied load upon the load support for approximately restoring said beam to the position which it occupied before the load was applied; means, comprising a power device supplied with power independent of the load, and controlled by the applied load for more nearly restoring said beam to the last named position; and means for indicating the weight of the load.

In testimony whereof I affix my signature in the presence of two subscribing witnesses.

JAMES W. BRYCE.

Witnesses:
  FELIX THOMAS,
  J. B. MCGUIRE.